(12) United States Patent
Sato et al.

(10) Patent No.: US 10,270,106 B2
(45) Date of Patent: Apr. 23, 2019

(54) TERMINAL PLATE FOR FUEL CELL, AND FUEL CELL

(71) Applicants: TOYOTA JIDOSHA KABUSHIKI KAISHA, Toyota-shi, Aichi-ken (JP); Sumitomo Riko Company Limited, Komaki-shi, Aichi (JP)

(72) Inventors: Kenji Sato, Kasugai (JP); Hiroki Itakura, Kitanagoya (JP); Takahiro Aoki, Kasugai (JP)

(73) Assignees: Toyota Jidosha Kabushiki Kaisha, Toyota-shi, Aichi-ken (JP); Sumitomo Riko Company Limited, Komaki-shi, Aichi (JP)

( * ) Notice: Subject to any disclaimer, the term of this patent is extended or adjusted under 35 U.S.C. 154(b) by 740 days.

(21) Appl. No.: 14/937,726

(22) Filed: Nov. 10, 2015

(65) Prior Publication Data

US 2016/0141638 A1    May 19, 2016

(30) Foreign Application Priority Data

Nov. 14, 2014   (JP) ................................. 2014-231211

(51) Int. Cl.
*H01M 8/0258* (2016.01)
*H01M 8/0206* (2016.01)
(Continued)

(52) U.S. Cl.
CPC ....... *H01M 8/0258* (2013.01); *H01M 8/0206* (2013.01); *H01M 8/0256* (2013.01); *H01M 8/0267* (2013.01); *H01M 8/2465* (2013.01)

(58) Field of Classification Search
CPC .................................................. H01M 8/0258
See application file for complete search history.

(56) References Cited

U.S. PATENT DOCUMENTS 8,153,333 B2    4/2012  Sugita et al.
2002/1031697    3/2002  Sugita et al.
(Continued)

FOREIGN PATENT DOCUMENTS

CN    104854746    8/2015
DE    112014000307   9/2015
(Continued)

OTHER PUBLICATIONS

Office Action issued in U.S. Appl. No. 14/874,716 dated Mar. 13, 2018.

(Continued)

*Primary Examiner* — Sarah A. Slifka
*Assistant Examiner* — Brian R Ohara
(74) *Attorney, Agent, or Firm* — Finnegan, Henderson, Farabow, Garrett & Dunner, LLP

(57) ABSTRACT

There is provided a terminal plate comprising a plate stacked body including a first metal plate that is electrically conductive and has a current collecting terminal for power collection, and second metal plates that have higher corrosion resistance than the first metal plate and are placed across the first metal plate. A first gasket is mounted to the second metal plate and is provided to surround at least a gas flow hole used for supply of a gas on the second metal plate-side. A second gasket is mounted to the second metal plate and is provided to surround a cooling water flow area which communicates with a cooling water flow hole used for supply of cooling water on the second metal plate-side. The current collecting terminal is protruded from a plate outer circumferential end of the first metal plate in a direction from one flow hole of the gas flow hole and the cooling water flow hole toward the plate outer circumferential end of the first metal plate. This configuration enables the current (Continued)

collecting terminal to be cooled down from the second metal plate-side via the first metal plate.

9 Claims, 9 Drawing Sheets

(51) Int. Cl.
*H01M 8/0267* (2016.01)
*H01M 8/0256* (2016.01)
*H01M 8/2465* (2016.01)

(56) References Cited

U.S. PATENT DOCUMENTS

| | | | |
|---|---|---|---|
| 2002/0058177 A1 | 5/2002 | Nishiyama et al. | |
| 2004/0137299 A1 | 7/2004 | Mazza et al. | |
| 2004/0151952 A1* | 8/2004 | Brady | H01M 8/0206 429/492 |
| 2006/0040159 A1 | 2/2006 | Sato et al. | |
| 2006/0204807 A1* | 9/2006 | Kosaka | H01M 8/0206 429/434 |
| 2010/0273076 A1* | 10/2010 | Kunitake | H01M 8/0228 429/434 |
| 2014/0051007 A1 | 2/2014 | Blanchet et al. | |
| 2016/0329577 A1 | 11/2016 | Shizuku | |

FOREIGN PATENT DOCUMENTS

| | | |
|---|---|---|
| JP | 2002-093454 A | 3/2002 |
| JP | 2004-103296 A | 4/2004 |
| JP | 2004-158341 | 6/2004 |
| JP | 2006-100021 | 4/2006 |
| JP | 2008-300131 A | 12/2008 |
| JP | 2009-187729 A | 8/2009 |
| JP | 2010-189749 A | 9/2010 |
| JP | 2010-212049 | 9/2010 |
| JP | 2010-282792 | 12/2010 |
| JP | 5342897 B2 | 11/2013 |
| JP | 2015-088294 A | 5/2015 |
| KR | 10-2015-0090209 | 8/2015 |

OTHER PUBLICATIONS

U.S. Appl. No, 14/874,716, filed Oct. 5, 2015.
Notice of Allowance issued in U.S. Appl. No. 14/874,716 dated Jul. 27, 2018.

* cited by examiner

COOLING WATER
(FROM COOLING WATER SUPPLY HOLE 176IN)

TERMINAL PLATE FOR FUEL CELL, AND FUEL CELL

CROSS-REFERENCE TO RELATED APPLICATIONS

The present application claims priority from Japanese patent application P2014-231211 filed on Nov. 14, 2014, the content of which is hereby incorporated by reference into this application.

BACKGROUND

Field

The present invention relates to a terminal plate for fuel cell, and a fuel cell.

Related Art

A fuel cell includes a fuel cell stack configured by stacking a plurality of unit cells as power generation units and has terminal plates provided to take out the generated electric power. The terminal plates are placed on the respective ends of the fuel cell stack and respectively have current collecting terminals for power collection protruded from plate outer circumferential ends (for example, JP 2004-158341A).

SUMMARY

The current collecting terminals of the terminal plates are used to output the electric power generated by the fuel cell stack of the plurality of unit cells to the outside and serve as electric current pathway. The current collecting terminal has a certain electric resistance, so that the Joule heat is generated with the flow of electric current to increase the temperature of the current collecting terminal. The higher flow of electric currents results in the higher temperature of the current collecting terminal. The heat of the current collecting terminal is transmitted to its periphery and is thus likely to cause thermal deterioration of a seal member such as gasket provided in the periphery of the current collecting terminal. The proposed terminal plates described above, however, take no measures to address a temperature rise of the current collecting terminal. The temperature rise of the current collecting terminal is likely to cause deterioration of the current collecting terminal itself and its peripheral components and to reduce the durability of the fuel cell by repetitive thermal expansion.

In order to solve at least part of the above problems, the invention may be implemented by any of the following aspects.

(1) According to one aspect of the invention, there is provided a terminal plate for fuel cell. The terminal plate for fuel cell may comprise a plate stacked body including a first metal plate that is electrically conductive and has a current collecting terminal for power collection, and second metal plates that have higher corrosion resistance than the first metal plate and are placed across the first metal plate; a gas flow hole that is formed to pass through the plate stacked body on an inner side of a stacked body outer periphery; a cooling water flow hole that is formed to pass through the plate stacked body on the inner side of the stacked body outer periphery such as not to interfere with the gas flow hole; a first gasket that is mounted to the second metal plate and is provided to surround at least the gas flow hole on the second metal plate-side; and a second gasket that is mounted to the second metal plate and is provided to surround a cooling water flow area which communicates with the cooling water flow hole, on the second metal plate-side. The current collecting terminal may be protruded from a plate outer circumferential end of the first metal plate in a direction from one flow hole of the gas flow hole used for supply of a gas and the cooling water flow hole used for supply of cooling water toward the plate outer circumferential end of the first metal plate.

In the terminal plate for fuel cell of the above aspect, the first gasket is mounted to the second metal plate and is provided to surround the gas flow hole used for supply of a gas on the second metal plate-side. The second metal plate is directly exposed to the gas that passes through the gas flow hole used for supply of the gas, in an area of the gas flow hole surrounded by the first gasket. The gas which the second metal plate is directly exposed to is the gas on the gas supply side and accordingly has low temperature. This configuration directly cools down the second metal plate and cools down the first metal plate placed across the second metal plates via the second metal plate. In the terminal plate for fuel cell of the above aspect, the second gasket is mounted to the second metal plate and is provided to surround the cooling water flow area which communicates with the cooling water flow hole used for supply of cooling water, on the second metal plate-side. The second metal plate is directly exposed to the cooling water that passes through the cooling water flow hole, in the cooling water flow area surrounded by the gasket and in an area of the cooling water flow hole. The cooling water which the second metal plate is directly exposed to is the cooling water on the cooling water supply side and accordingly has low temperature. This configuration directly cools down the second metal plate and cools down the first metal plate placed across the second metal plates via the second metal plate. In the terminal plate for fuel cell of the above aspect, the current collecting terminal of the first metal plate is protruded from the plate outer circumferential end of the first metal plate in the direction from one flow hole of the gas flow hole and the cooling water flow hole, which is configured to cool down the first metal plate via the second metal plate, toward the plate outer circumferential end of the first metal plate. This configuration enables the current collecting terminal protruded from the plate outer circumferential end of the first metal plate to be cooled down by the low-temperature gas or by the low-temperature cooling water. This accordingly suppresses a temperature rise of the current collecting terminal.

(2) In the terminal plate for fuel cell of the above aspect, at least the cooling water flow hole may have a hole circumferential wall surface sealed by a seal member. This configuration prevents plate end faces (hole circumferential wall surface) of the plate stacked body of the first metal plate and the second metal plates that are made of different metal plates, from being exposed to the cooling water. This configuration of the terminal plate for fuel cell accordingly suppresses electric corrosion of the plate stacked body in which the first metal plate is placed between the second metal plates.

(3) In the terminal plate for fuel cell of the above aspect, the one flow hole from which the current collecting terminal of the first metal plate is protruded may be divided into a plurality of holes, and a seal member may be provided to seal a bridge wall of a bridge located between the plurality of holes. The current collecting terminal may be protruded from the plate outer circumferential end of the first metal plate in a direction from the bridge toward the plate outer circumferential end of the first metal plate. This configuration enables the bridge of the first metal plate to be cooled down via the second metal plate by the low-temperature gas that passes through the gas flow hole used for supply of the gas or by the low-temperature cooling water that passes through the cooling water flow hole used for supply of the cooling water. This more effectively suppresses a temperature rise of the current collecting terminal.

(4) According to another aspect of the invention, there is provided a fuel cell. The fuel cell may comprise a cell stack configured by stacking a plurality of unit cells as power generation units; and the terminal plates for fuel cell according to any of the above aspects, which are placed on one end and on the other end in a stacking direction of the cell stack. The fuel cell of this aspect includes the terminal plate that is configured to suppress a temperature rise of the current collecting terminal. This improves the durability and the cell life of the fuel cell. Additionally, the fuel cell of this aspect is readily produced by replacing terminal plates of the conventional fuel cell with the terminal plates according to any of the above aspects. This suppresses an increase in workload for changing the design and suppresses an increase in manufacturing cost.

The present invention may be implemented by any of various other aspects, for example, a method of manufacturing the terminal plate for fuel cell and a method of manufacturing the fuel cell.

DESCRIPTION OF THE EMBODIMENTS

Figure 1:
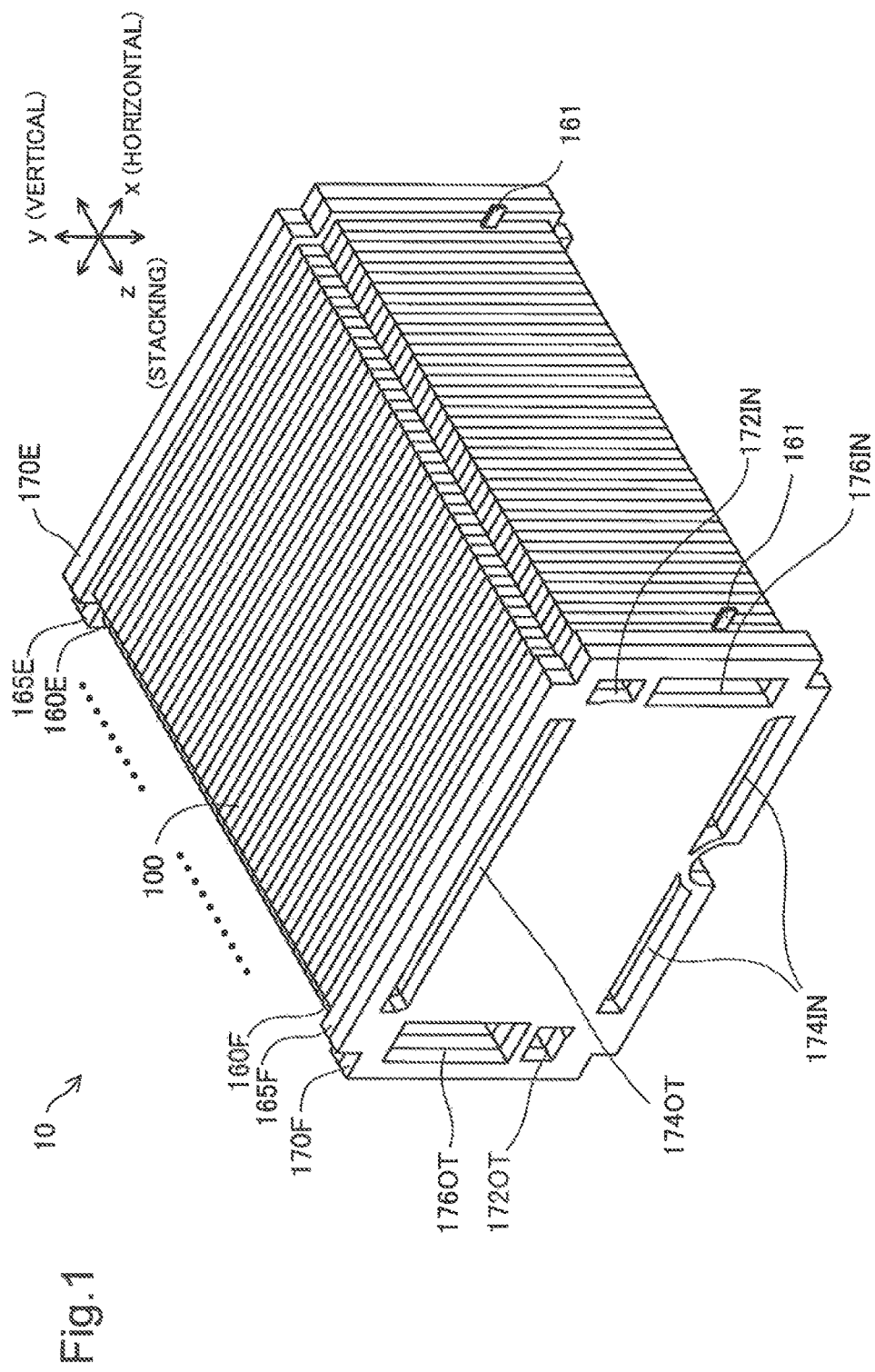
FIG. 1 is a schematic perspective view illustrating the configuration of a fuel cell according to one embodiment of the invention.

The following describes some embodiments of the invention with reference to drawings. FIG. 1 is a schematic perspective view illustrating the configuration of a fuel cell 10 using terminal plates 160E and 160F according to one embodiment of the invention. The fuel cell 10 has a stack structure provided by stacking a plurality of unit cells 100 such that the respective surfaces are in contact with one another and by placing a pair of end plates 170F and 170E across the stacked unit cells 100. In the illustration and the description, this stacking direction is also called z direction. A longitudinal direction of the unit cells 100 is called x direction (horizontal direction), and a direction perpendicular to the z direction and the x direction is called y direction (vertical direction). In the fuel cell 10, an insulator plate 165F and a terminal plate 160F are placed between the end plate 170F and the unit cell 100 on one end side, such that the insulator plate 165F is located on the end plate 170F-side.

The fuel cell 10 also has a similar configuration on the other end side. More specifically, in the fuel cell 10, an insulator plate 165E and a terminal plate 160E are placed between the end plate 170E and the unit cell 100 on the other end side, such that the insulator plate 165E is located on the end plate 170E-side. The unit cell 100, the terminal plates 160F and 160E, the insulator plates 165F and 165E and the end plates 170F and 170E are respectively plates that are formed in a rectangular outer shape and are arranged to have the longer side along the x direction (horizontal direction) and the shorter side along the y direction (vertical direction, perpendicular direction). For convenience of explanation, in the description below, one end side of the fuel cell 10 where the end plate 170F is located is called front end side, and the other end side of the fuel cell 10 where the end plate 170E is located is called rear end side. The symbol "F" given as the suffix of a numeral representing each member indicates a front end-side member, and the symbol "E" given as the suffix of a numeral representing each member indicates a rear end-side member.

The end plate 170F on the front end side has a fuel gas supply hole 172IN, a fuel gas discharge hole 172OT, oxidizing gas supply holes 174IN, an oxidizing gas discharge hole 174OT, a cooling water supply hole 176IN and a cooling water discharge hole 176OT. The insulator plate 165F and the terminal plate 160F on the front end side also has similar supply holes and discharge holes. These supply holes and discharge holes (hereinafter may be collectively referred to as "supply and discharge holes") respectively communicate with corresponding holes (not shown) provided at corresponding positions in the respective unit cells 100 to form supply manifolds and discharge manifolds of fuel gas, oxidizing gas and cooling water. The end plate 170E, the insulator plate 165E and the terminal plate 160E on the rear end side, on the other hand, have no such supply and discharge holes. This is attributed to the configuration of the fuel cell that reactive gases (fuel gas and oxidizing gas) and cooling water are supplied from the end plate 170F on the front end side through the respective supply manifolds in the stacked unit cells 100 to the respective unit cells 100 and that off-gases and cooling water collected from the respective unit cells 100 go through the respective discharge manifolds in the stacked unit cells 100 and are discharged from the end plate 170F on the front end side out of the fuel cell 10. The configuration of the fuel cell is, however, not limited to this configuration but may be any of various other configurations, for example, a configuration that the reactive gases and cooling water are supplied from the end plate 170F on the front end side and that the off-gases and cooling water are discharged from the end plate 170E on the rear end side out of the fuel cell.

The oxidizing gas supply holes 174IN are arranged along the x direction (horizontal direction) in a lower circumferential part of the end plate 170F on the front end side, and the oxidizing gas discharge hole 174OT is arranged along the x direction in an upper circumferential part of the end plate 170F. The fuel gas supply hole 172IN is arranged on an upper end in the y direction (vertical direction) in a right circumferential part of the end plate 170F on the front end side, and the fuel gas discharge hole 172OT is arranged on a lower end in the y direction in a left circumferential part of the end plate 170F. The cooling water supply hole 176IN is arranged along the y direction below the fuel gas supply hole 172IN, and the cooling water discharge hole 176OT is arranged along the y direction above the fuel gas discharge hole 172OT. Each of these supply and discharge holes other than the supply and discharge holes of the fuel gas is divided into a plurality of corresponding supply or discharge holes in each of the unit cells 100.

The terminal plate 160F on the front end side and the terminal plate 160E on the rear end side serve as current collectors of electric power generated by the respective unit cells 100 and are configured to output the collected electric power from current collecting terminals 161 to outside. These terminal plates 160F and 160E will be described below in detail.

Figure 2:
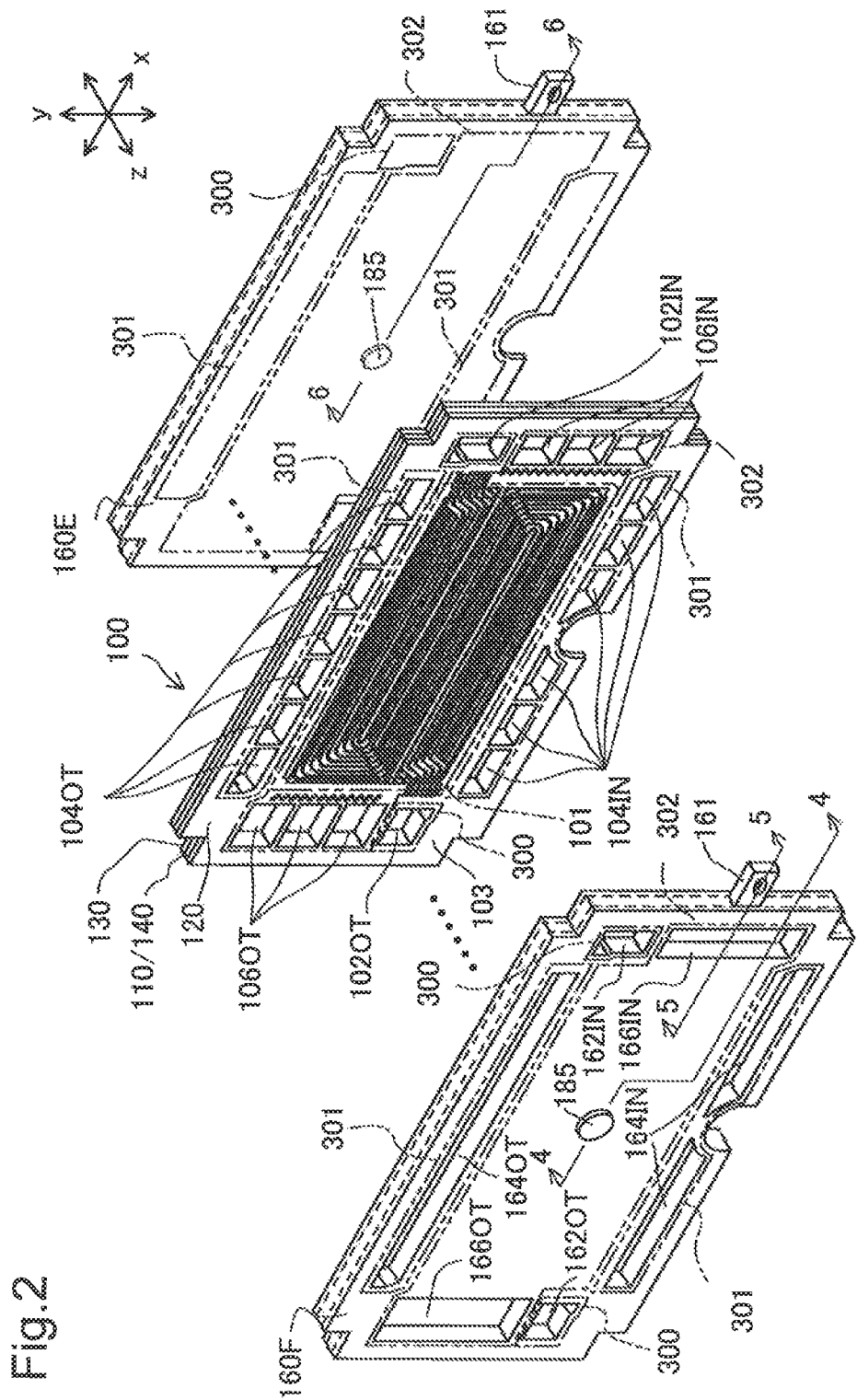
FIG. 2 is a diagram schematically illustrating the arrangement of a terminal plate, a unit cell and another terminal plate.

FIG. 2 is a diagram schematically illustrating the arrangement of the terminal plate 160F, the unit cell 100 and the terminal plate 160E. As shown in FIG. 2, the unit cell 100 includes an anode-side separator 120, a cathode-side separator 130 and an adhesive seal 140. The adhesive seal 140 is a frame-like member having both the sealing function and the adhesive function. An MEGA (membrane electrode and gas diffusion layer assembly) 110 is placed in a separator center area 101, and the adhesive seal 140 is provided to hold and seal the circumferential edge of the MEGA 110. In the unit cell 100, the adhesive seal 140 provided to hold the MEGA 110 is placed between the anode-side separator 120 and the cathode-side separator 130. Accordingly, the MEGA 110 placed in the separator center area 101 is held between the two separators 120 and 130, and the adhesive seal 140 is placed to provide a seal between the two separators 120 and 130 in an outer peripheral portion 103 surrounding the separator center area 101.

The MEGA is a power generation element that includes a membrane electrode assembly (MEA) having a pair of catalyst electrode layers formed on respective surfaces of an electrolyte membrane and has gas-diffusible and gas-permeable gas diffusion layers (GDL) placed across the MEA.

The anode-side separator 120 and the cathode-side separator 130 are made of a material having gas barrier properties and electron conductivity, for example, a carbon material such as gas-impermeable dense carbon produced by compressing carbon particles or a press-formed metal material such as stainless steel or titanium. According to this embodiment, the anode-side separator 120 is made by press-forming stainless steel.

The anode-side separator 120 has a fuel gas flow path formed in a plurality of grooves on one surface facing the MEGA 110 and a cooling water flow path formed in a plurality of grooves on the other surface. The fuel gas flow path and the cooling water flow path are arranged alternately on the front surface and the rear surface of the separator. The unit cell 100 includes a fuel gas supply hole 102IN, a fuel gas discharge hole 102OT, a plurality of oxidizing gas supply holes 104IN, a plurality of oxidizing gas discharge holes 104OT, a plurality of cooling water supply holes 106IN and a plurality of cooling water discharge holes 106OT that are formed to pass through the anode-side separator 120, the adhesive seal 140 and the cathode-side separator 130. These supply and discharge holes communicate with the corresponding supply and discharge holes (e.g., fuel gas supply hole 172IN) formed in the end plate 170F to form respective supply and discharge manifolds in the stack of unit cells 100. The flow paths formed in the anode-side separator 120 are not directly involved in the scope of the invention and are not described in detail.

The adhesive seal 140 is made of a resin, a rubber or the like having sealing properties and the insulating properties and has a power generation area window (not shown) formed in its center in a shape corresponding to the rectangular shape of the MEGA 110. The MEGA 110 is placed in and mounted to this power generation area window. The adhesive seal 140 with the MEGA 110 placed in its power generation area window is held between the anode-side separator 120 and the cathode-side separator 130 to seal the anode-side separator 120 and the cathode-side separator 130 including the respective supply and discharge holes. Either one of the two separators 120 and 130 has fuel gas seal members 300, oxidizing gas seal members 301 and and a cooling water seal member 302 to ensure the sealing properties of the supply and discharge holes of the fuel gas, the oxidizing gas and the cooling water at the joint surfaces of adjacent separators in the stack of the unit cells 100. These seal members 300, 301 and 302 are also called gaskets. These seal members 300, 301 and 302 are provided on the cathode-side separator 130 according to this embodiment but are shown on the anode-side separator 120 in FIG. 2 for convenience of illustration.

Figure 3:
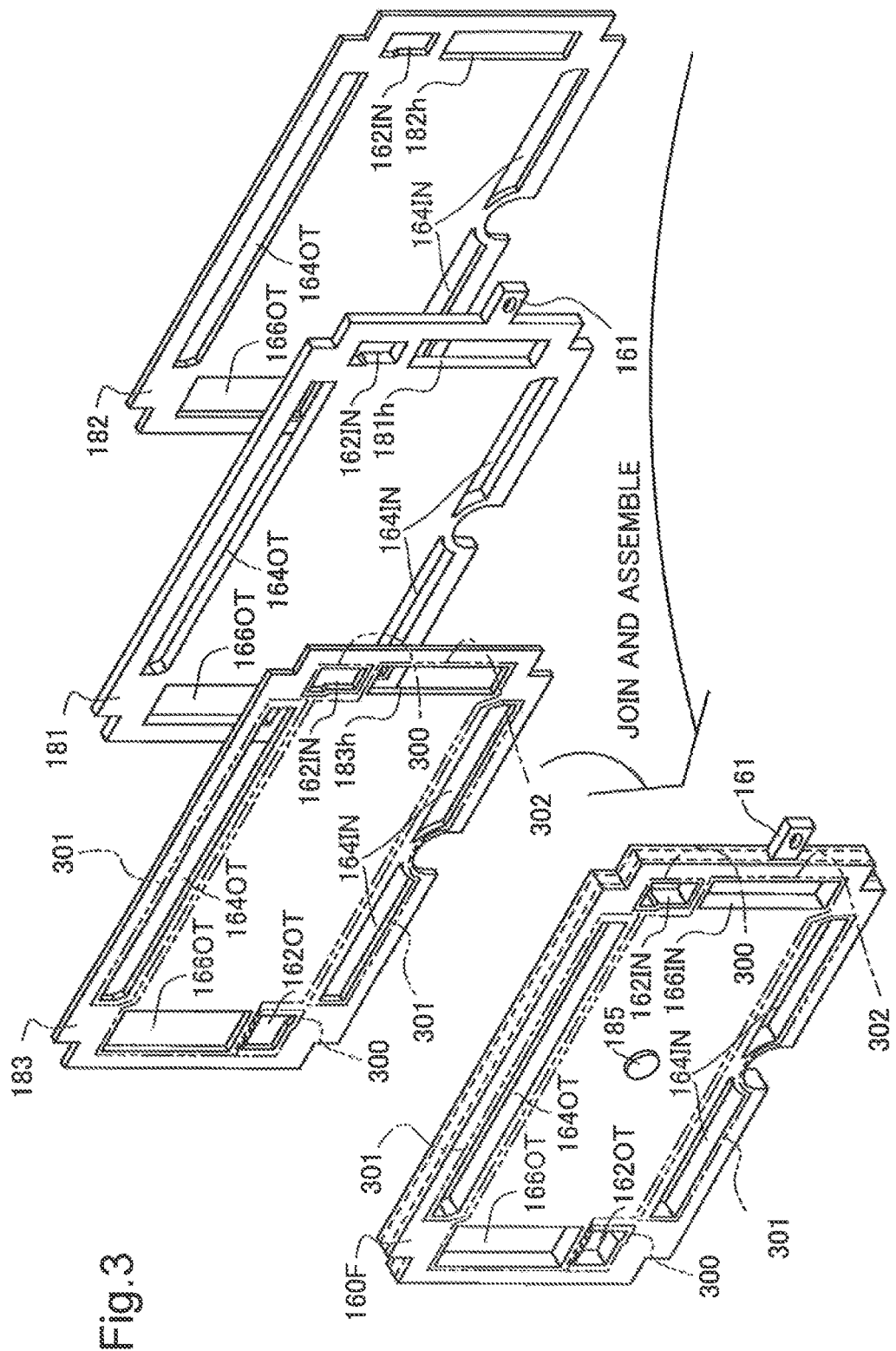
FIG. 3 is a perspective view illustrating components constituting the terminal plate.
Figure 4:
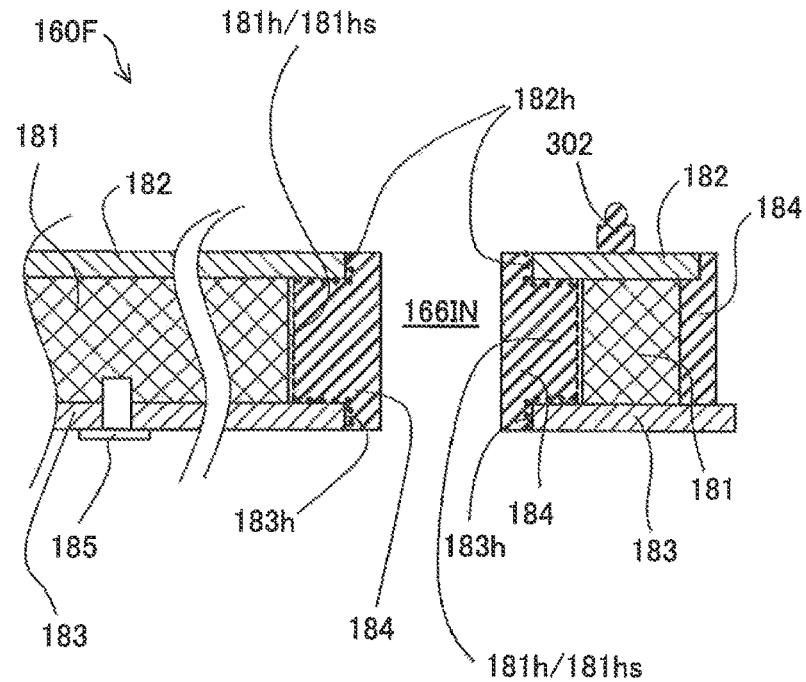
FIG. 4 is a sectional view illustrating the terminal plate, taken on a line 4-4 in FIG. 2.
Figure 5:
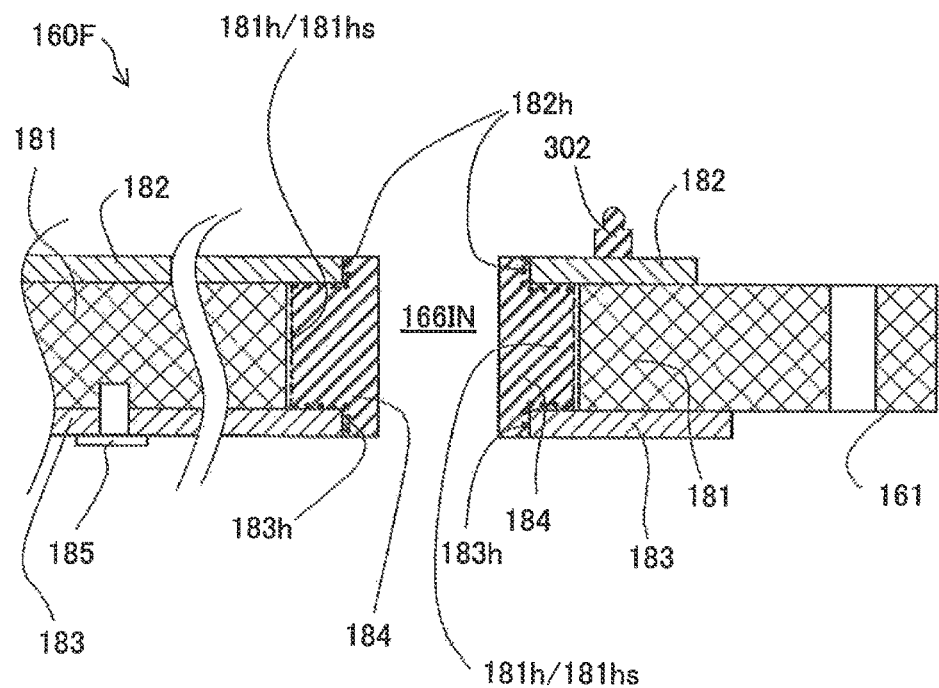
FIG. 5 is a sectional view illustrating the terminal plate, taken on a line 5-5 in FIG. 2 along the extending direction of a current collecting terminal.
Figure 6:
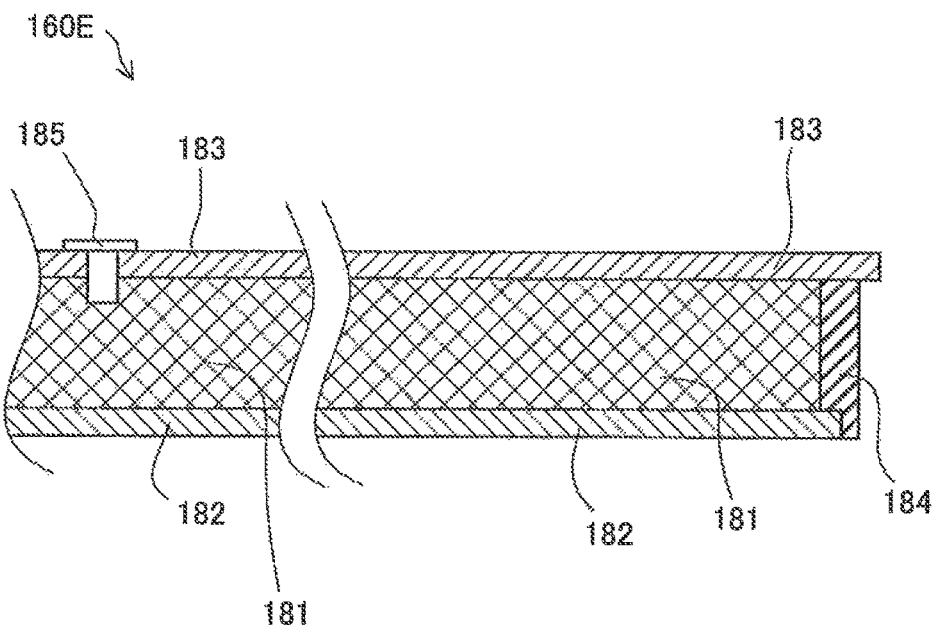
FIG. 6 is a sectional view illustrating the terminal plate, taken on a line 6-6 in FIG. 2.

The following describes the terminal plates 160F and 160E. In the fuel cell 10, the terminal plate 160F on the front end side and the terminal plate 160E on the rear end side differ from each other by the presence or the absence of the supply and discharge holes but otherwise have similar configurations. FIG. 3 is a perspective view illustrating components constituting the terminal plate 160F. FIG. 4 is a sectional view illustrating the terminal plate 160F, taken on a line 4-4 in FIG. 2. FIG. 5 is a sectional view illustrating the terminal plate 160F, taken on a line 5-5 in FIG. 2. FIG. 6 is a sectional view illustrating the terminal plate 160E, taken on a line 6-6 in FIG. 2.

As illustrated, the terminal plate 160F has a three-layered structure including a core plate 181 having the current collecting terminal 161, a cell-side plate 182 and an end plate-side plate 183. Supply and discharge holes are adequately formed in the respective plates 181, 182 and 183, so that the terminal plate 160F has a fuel gas supply hole 162IN, a fuel gas discharge hole 162OT, oxidizing gas supply holes 164IN, an oxidizing gas discharge hole 164OT, a cooling water supply hole 166IN and a cooling water discharge hole 166OT that are formed to pass through the respective plates 181, 182 and 183. These supply and discharge holes communicate with the corresponding supply and discharge holes (e.g., fuel gas supply hole 172IN) formed in the end plate 170F and with the corresponding supply and discharge holes (e.g., fuel gas supply hole 102IN) formed in the respective unit cells 100 to form respective supply and discharge manifolds of the reactive gases and cooling water to the respective unit cells 10.

The core plate 181 is an electrically conductive metal plate, for example, a gold, silver, copper or aluminum metal plate. According to this embodiment, in terms of cost reduction and weight reduction, an aluminum metal plate of about 1.0 to 5.0 mm in thickness is employed for the core plate 181. Both the cell-side plate 182 and the end plate-side plate 183 are metal plates (of 0.1 to 1.0 mm in thickness), such as titanium plates, having the higher corrosion resistance than that of the core plate 181 and having slightly larger outer shapes than that of the core plate 181. The cell-side plate 182 and the end plate-side plate 183 have their plate circumferential edges located on the outer side of the plate circumferential edge of the core plate 181 and are respectively in surface contact with the opposed surfaces of the core plate 181 to hole the core plate 181 placed therebetween. The core plate 181 has a plate through hole 181h having a larger diameter than the diameter of the cooling water supply hole 166IN, which is formed by placing a plate adhesive seal member 184 (described below) inside of the plate through hole 181h. The cell-side plate 182 and the end plate-side plate 183 respectively have plate through holes 182h and 183h having diameters that are larger than the diameter of the cooling water supply hole 166IN but are smaller than the diameters of the plate through hole 181h of the core plate 181.

The plate adhesive seal member 184 is made of a rubber having sealing properties and elasticity, for example, ethylene propylene diene rubber (EPDM), nitrile rubber (NBR) or fluororubber (FKM). As shown in FIG. 4, in the state that the core plate 181 is placed between the cell-side plate 182 and the end plate-side plate 183, the plate adhesive seal member 184 is provided to coat the circumferential edges of the respective plates 181, 182 and 183 and maintain the three-layered structure described above. The plate adhesive seal member 184 is also arranged along the inner wall of the plate through hole 181h to form the cooling water supply hole 166IN. The plate adhesive seal member 184 is provided to coat the hole circumferential wall surfaces of the respective plate through holes 181h to 183h in the core plate 181, the outer cell-side plate 182 and the outer end plate-side plate 183. The plate through hole 81h of the core plate 181 has the larger diameter than the diameters of the plate through holes 182h and 183h on the respective outer sides. As shown in FIGS. 4 and 5, the plate adhesive seal member 184 is provided to additionally coat the core plate 181-side surfaces of the cell-side plate 182 and the end plate-side plate 183 surrounding the plate through holes 182h and 183. In other words, the cooling water supply hole 166IN serves as the hole that causes the cooling water to pass through, in such a state that the hole circumferential wall surfaces of the plate through holes 181h to 183h of the respective plates 181 to 183 formed to pass through the terminal plate 160F on the inner side of its plate circumferential edge are sealed by the plate adhesive seal member 184. Like the cooling water supply hole 166IN coated by the plate adhesive seal member 184, the other supply and discharge holes, i.e., the fuel gas supply hole 162IN, the fuel gas discharge hole 162OT, the oxidizing gas supply hole 164IN, the oxidizing gas discharge hole 164OT and the cooling water discharge hole 166OT are similarly coated by the plate adhesive seal member 184.

Like the unit cell 100, the terminal plate 160F has fuel gas seal members 300, oxidizing gas seal members 301 and a cooling water seal member 302. At least one of the fuel gas seal member 300 and the oxidizing gas seal member 301 of the terminal plate 160F corresponds to the subordinate concept of the first gasket of the invention. The cooling water seal member 302 corresponds to the subordinate concept of the second gasket of the invention. As shown in FIGS. 2 and 3, the fuel gas seal members 300 are placed to individually surround the fuel gas supply hole 162IN and the fuel gas discharge hole 162OT. Similarly, the oxidizing gas seal members 301 are placed to individually surround the oxidizing gas supply hole 164IN and the oxidizing gas discharge hole 164OT. The cooling water seal member 302 is placed to surround the cooling water supply hole 166IN, the cooling water discharge hole 166OT and the cooling water flow path formed in the plurality of grooves in the anode-side separator 120 of the unit cell 100 (shown in FIG. 2). According to this embodiment, the respective seal members 300, 301 and 302 described above are provided on the cell-side plate 182 of the terminal plate 160F that is joined with the unit cell 100, so as to provide sealing between the terminal plate 160F and the unit cell 100. For convenience of illustration, however, the respective seal members 300, 301 and 302 are shown on the end plate-side plate 183 in FIG. 3. Corresponding seal members (not shown) provided on a terminal plate 160F-side surface of the insulator plate 165F provide sealing between the end plate-side plate 183 of the terminal plate 160F and the insulator plate 165F. These seal members may be provided on the end plate-side plate 183 of the terminal plate 160F as shown in FIG. 3 to provide sealing between the terminal plate 160F and the insulator plate 165F. In either case, a cooling water seal member placed between the terminal plate 160F and the insulator plate 165F is arranged to surround the plate through hole 183h for forming the cooling water supply hole 166IN, unlike the cooling water seal member 302 placed between the terminal plate 160F and the unit cell 100.

The current collecting terminal 161 provided on the core plate 181 is formed in a shape protruded outward from the plate circumferential edge on the outer side of the cooling water supply hole 166IN on the cooling water supply side as shown in FIG. 3. This current collecting terminal 161 is connected with a plate circumferential edge area of the core plate 181 placed between the cell-side plate 182 and the end plate-side plate 183 shown in FIG. 5.

The terminal plate 160F has an inter-plate pin 185 provided on the approximate center of the end plate-side plate 183. As shown in FIG. 5, this inter-plate pin 185 is a flanged pin driven from the end plate-side plate 183. A small diameter portion of the inter-plate pin 185 joins the core plate 181 with the end plate-side plate 183 to prevent positional misalignment of these two plates 181 and 183. The insulator plate 165F and the end plate 170F are stacked on the terminal plate 160F in such a manner as not to interfere with the inter-plate pin 185. Similarly an inter-plate pin 185 is provided on the terminal plate 160E on the end plate 170E-side as shown in FIG. 6. The insulator plate 165E and the end plate 170E are stacked on the terminal plate 160E in such a manner as not to interfere with the inter-plate pin 185.

The following describes coating the terminal plate 160F with the plate adhesive seal member 184, along with a procedure of manufacturing the terminal plate 160F. With regard to the core plate 181, the respective plate surfaces, the plate outer circumferential end face, and the hole circumferential wall surface of the plate through hole 181h are gold-plated. Gold-plating of the respective plate surfaces provides the terminal plate 160F produced by stacking the three plates, i.e., the core plate 181, the cell-side plate 182 and the end plate-side plate 183 with the corrosion resistance and the good electrical conductivity over the entire areas of the plate surfaces.

The gold-plated core plate 181 is stacked on the end plate-side plate 183, such that the plate through hole 181h and the core plate 181 and the plate through hole 183h of the end plate-side plate 183 are made substantially concentric with each other. The plate adhesive seal member 184 is then mounted in this state. The plate adhesive seal member 184 includes a frame-like seal portion that is arranged to surround the circumferential edge of the core plate 181 and frame-like seal portions that are arranged to surround the respective supply and discharge holes such as the fuel gas supply hole 162IN and the cooling water supply hole 166IN. These seal portions are fit in the circumferential edge and the plate through holes. Subsequently the cell-side plate 182 is stacked on the core plate 181, such that the plate through hole 182 of the cell-side plate 182 and the plate through hole 181h of the core plate 181 are made substantially concentric with each other. In the state that the stacked plates 181, 182 and 183 are pressed, the plate adhesive seal member 184 provided around the respective supply discharge holes such as the fuel gas supply hole 162IN and the cooling water supply hole 166IN is heated from both the cell-side plate 182-side and the end plate-side plate 183-side for a predetermined time duration, and is subsequently cooled down to be cured. The core plate 181 and the end plate-side plate 183 are joined with each other by the inter-plate pin 185.

In the state that the core plate 181 is placed between the cell-side plate 182 and the end plate-side plate 183, the plate adhesive seal member 184 is provided to coat the circumferential edges of the respective plates 181 to 183 and the inner circumferences of the plate through holes 181h to 183h formed to pass through the respective plates 181 to 183. Coating the inner circumferences of the plate through holes 181h to 183h by the plate adhesive seal member 184 forms the cooling water supply hole 166IN. When the plate adhesive seal member 184 placed in this arrangement is heated, the plate adhesive seal member 184 is thermally fused to be bonded to the cell-side plate 182 and the end plate-side plate 183 at locations shown by dots in FIGS. 4 and 5, i.e., in locations that are in contact with the cell-side plate 182 and the end plate-side plate 183 around the respective plate through holes 182h and 183h. The core plate 181 is, on the other hand, gold-plated. Gold-plating reduces the activity of the plate outer circumferential end face of the core plate 181 that is the interface between the core plate 181 and the plate adhesive seal member 184, so that the plate adhesive seal member 184 is not bonded to the core plate 181 at the plate outer circumferential end face. Additionally, gold-plating also reduces the activity of a gold-plated hole circumferential wall surface 181hs of the plate through hole 181h of the core plate 181, so that the plate adhesive seal member 184 is not bonded to the core plate 181 at the hole circumferential wall surface 181hs.

The terminal plate 160E does not have the supply and discharge holes such as the fuel gas supply hole 162IN. In the state that the core plate 181 is placed between the cell-side plate 182 and the end plate-side plate 183, the plate adhesive seal member 184 is provided to coat the circumferential edges of the respective plates 181 to 183 and maintain the layered structure of the respective plates 181 to 183 as shown in FIG. 6. The core plate 181 is gold-plated, so that the plate adhesive seal member 184 is not bonded to the core plate 181 at the plate outer circumferential end face of the core plate 181 that is the interface between the core plate 181 and the plate adhesive seal member 184.

Figure 7:
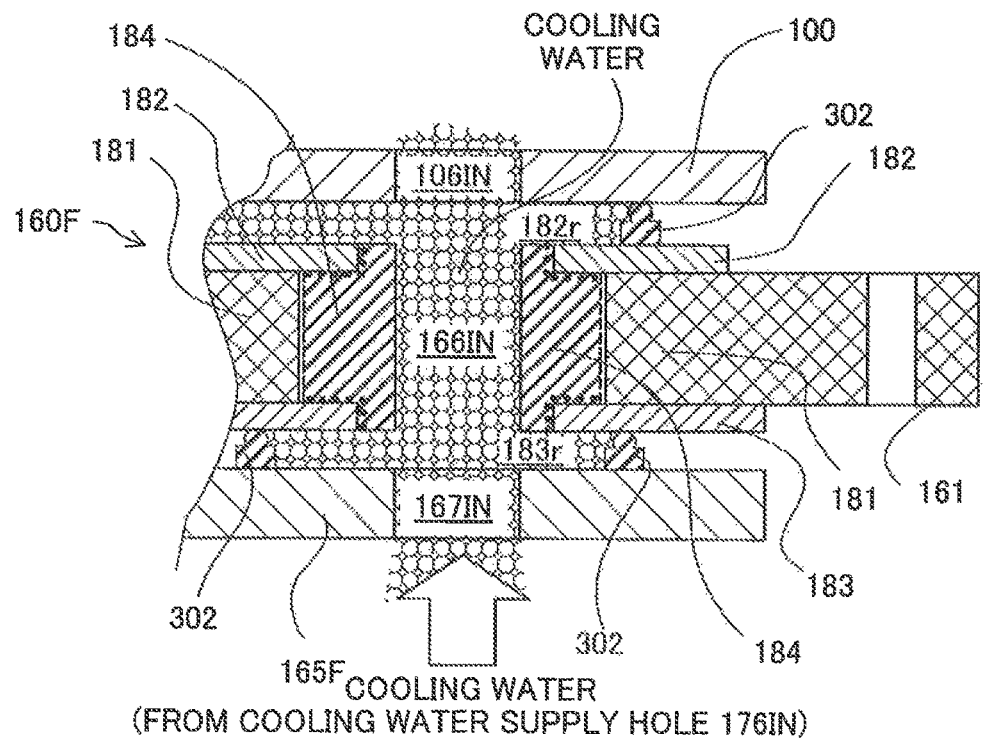
FIG. 7 is a diagram illustrating the state of cooling water in the periphery of a cooling water supply hole during operation of the fuel cell.

The following describes the behavior of cooling water during operation of the fuel cell 10 including the terminal plate 160F described above. FIG. 7 is a diagram illustrating the state of cooling water in the periphery of the cooling water supply hole 166IN during operation of the fuel cell 10.

In the fuel cell 10 configured by stacking the respective members including the terminal plate 160F, the terminal plate 160F is placed between the insulator plate 165F and the unit cell 100 as shown in FIG. 7. The cooling water seal members 302 provide sealing between the adjacent plates in the periphery of the cooling water supply hole 166IN. The cooling water seal member 302 provided on the cell-side plate 182 forms a flow area 182r of cooling water between the terminal plate 160F and the unit cell 100. The cooling water seal member 302 provided on the insulator plate 165F forms a flow area 183r of cooling water between the terminal plate 160F and the insulator plate 165F. The flow area 182r and the flow area 183r are connected with each other by the cooling water supply hole 166IN of the terminal plate 160F. Cooling water supplied from the cooling water supply hole 176IN of the end plate 170F (shown in FIG. 1) is spread over the flow area 183r via a cooling water supply hole 167IN formed in the insulator plate 165F, passes through the cooling water supply hole 166IN of the terminal plate 160F, is subsequently spread over the flow area 182r, and passes through the cooling water flow path of the unit cell 100 (shown in FIG. 2) and the cooling water supply hole 106IN. The flow of supplied cooling water is sealed by the plate adhesive seal member 184 and is thus not exposed to the hole circumferential wall surface 181hs of the plate through hole 181h of the core plate 181, the plate through hole 182h of the cell-side plate 182 or the plate through hole 183h of the end plate-side plate 183. The flow of cooling water spread over the flow area 182r and the flow area 183r is, on the other hand, directly exposed to the cell-side plate 182 and the end plate-side plate 183 at least in the periphery of the cooling water supply hole 166IN.

As described above, the terminal plate 160F and the terminal plate 160E included in the fuel cell 10 of this embodiment are respectively configured by placing the core plate 181 that is an electrically conductive aluminum plate having the current collecting terminal 161 between the cell-side plate 182 and the end plate-side plate 183 that are titanium plates having high corrosion resistance. The plate circumferential edges of both the cell-side plate 182 and the end plate-side plate 183 are extended outward from the plate circumferential edge of the core plate 181. The plate adhesive seal member 184 is provided to coat the circumferential edges of the respective plates 181 to 183 and maintain the layered structure in which the core plate 181 is placed between the adjacent plates 182 and 183. In this state, the plate adhesive seal member 184 is bonded to the plate surfaces and the plate outer circumferential end faces of the cell-side plate 182 and the end plate-side plate 183, which are extended outward from the circumferential edge of the core plate 181. The core plate 181, on the other hand, has the gold-plated outer circumferential end face, so that the plate adhesive seal member 184 is not bonded to the core plate 181 at the plate outer circumferential end face.

In the unit cells 100 with the terminal plate 160F and the terminal plate 160E described above, it is assumed that the cell temperature is varied between high temperature and low temperature accompanied with power generation operation of the fuel cell 10 and/or a variation in ambient temperature between high temperature and low temperature. In the terminal plate 160F and the terminal plate 160E, the core plate 181 and the outer cell-side plate 182 and the outer end plate-side plate 183 placed on the respective sides of the core plate 181 (hereinafter the cell-side plate 182 and the end plate-side plate 183 are collectively called outside plates 182 and 183) have different linear expansion coefficients and thereby repeat expansion and contraction at different degrees. The core plate 181 having the higher linear expansion coefficient has the higher degree of expansion and contraction and is misaligned relative to the outside plates 182 and 183. The core plate 181, however, has the gold-plated outer circumferential end faces that is not bonded to the plate adhesive seal member 184, so that the core plate 181 misaligned relative to the outside plates 182 and 183 is movable to some extent relative to the plate adhesive seal member 184. Accordingly, the terminal plate 160F and the terminal plate 160E for fuel cell of this embodiment are configured to suppress deterioration of the plate adhesive seal member 184 that is provided to maintain the layered structure of the plates. This configuration also enhances the durability of the terminal plates 160F and 160E and thereby the fuel cell 10 including the terminal plates 160F and 160E.

The terminal plate 160F included in the fuel cell 10 of the embodiment has the supply and discharge holes, such as the fuel gas supply hole 162IN and the fuel gas discharge hole 162OT, which are involved in supply and discharge of the fuel gas, the oxidizing gas and the cooling water to and from the unit cells 100 and formed on the inner side of the plate circumferential edge. In the terminal plate 160F included in the fuel cell 10 of the embodiment, the core plate 181 has the plate through holes 181h having the diameters that are larger than the diameters of the corresponding supply and discharge holes, for example, the fuel gas supply hole 162IN and the fuel gas discharge hole 162OT. The outside plates 182 and 183 have the plate through holes 182h and 183h having the diameters that are larger than the diameters of the corresponding supply and discharge holes, for example, the fuel gas supply hole 162IN and the fuel gas discharge hole 162OT but are smaller than the corresponding plate through holes 181h. In the terminal plate 160F of this embodiment, the plate adhesive seal members 184 are placed to form the supply and discharge holes such as the fuel gas supply hole 162IN and the fuel gas discharge hole 162OT and coat the hole circumferential wall surfaces of the plate through holes 181h to 183h of the respective plates 181 to 183. The hole circumferential wall surface 181hs of the plate through hole 181h is gold-plated, so that the core plate 181 is not bonded to the plate adhesive seal member 184 at the hole circumferential wall surface 181hs. The plate adhesive seal member 184 is bonded to the outside plates, i.e., the cell-side plate 182 and the end plate-side plate 183, at the respective plate surfaces between the hole circumferential wall surface 181hs of the plate through hole 181h and the plate through holes 182h and 183h, at the hole circumferential wall surfaces of the plate through holes 182h and 183h and the plate outer circumferential end faces. Even in the case of a variation in cell temperature between high temperature and low temperature, this configuration of the terminal plate 160F makes it unlikely to apply the force of pulling the plate adhesive seal member 184 to the plate outer circumferential end face of the core plate 181 especially during contraction. Additionally, even in the case of contraction of the core plate 181, the force of pulling the plate adhesive seal member 184 is unlikely to be applied in the peripheries of the supply and discharge holes such as the fuel gas supply hole 162IN and the fuel gas discharge hole 162OT. As a result, the terminal plate 160F for fuel cell of this embodiment highly effectively suppresses deterioration of the plate adhesive seal member 184 and thereby contributes to improvement of the durability of the fuel cell 10.

In the terminal plate 160F and the terminal plate 160E included in the fuel cell 10 of the embodiment, the interplate pin 185 is provided to suppress misalignment between the core plate 181 and the end plate-side plate 183. Accordingly, in the application of the fuel cell 10 mounted on, for example, a vehicle, even in the case where an impact by a collision is applied to the respective parts of the fuel cell 10, this configuration suppresses misalignment between the core plate 181 and the end plate-side plate 183.

The fuel cell 10 of the embodiment is configured by stacking a plurality of the unit cells 100 as power generation units and placing the terminal plate 160F on one end and the terminal plate 160E on the other end of the unit cells 100 in the stacking direction. The fuel cell 10 of the embodiment includes the terminal plate 160F and the terminal plate 160E having the enhanced durability by suppression of deterioration of the plate adhesive seal members 184. This improves the durability and the cell life of the fuel cell 10. The fuel cell 10 of the embodiment is readily produced by replacing the terminal plates of the conventional fuel cell with the terminal plate 160F and the terminal plate 160E. This reduces the manufacturing cost.

In the terminal plate 160F included in the fuel cell 10 of the embodiment, as shown in FIG. 7, the flow area 182r of cooling water surrounded by the cooling water seal member 302 is provided on the cell-side plate 182, and the flow area 183r of cooling water surrounded by the cooling water seal member 302 is provided on the end plate-side plate 183. These flow areas 182r and 183r are connected by the cooling water supply hole 166IN. The cooling water supplied from the cooling water supply hole 176In of the end plate 170F (shown in FIG. 1) is spread over the flow area 182r and the flow area 183r. The cell-side plate 182 and the end plate-side plate 183 are directly exposed to the supplied cooling water in the flow areas 182r and 183r except the area of the cooling water supply hole 166IN. The cooling water which the cell-side plate 182 and the end plate-side plate 183 are directly exposed to is the cooling water just supplied from the end plate 170F on the cooling water supply side and accordingly has low temperature. In the terminal plate 160F included in the fuel cell 10 of the embodiment, the cell-side plate 182 and the end plate-side plate 183 are thus directly cooled down by the low-temperature cooling water, while the core plate 181 placed between the cell-side plate 182 and the end plate-side plate 183 is effectively cooled down via the cooled cell-side plate 182 and end plate-side plate 183. In the terminal plate 160F included in the fuel cell 10 of the embodiment, the current collecting terminal 161 of the core plate 181 is protruded from the plate outer circumferential end of the core plate 181 in a direction from the cooling water supply hole 166IN on the cooling water supply side for cooling down the core plate 181 via the cell-side plate 182 and the end plate-side plate 183 toward the plate outer circumferential end of the core plate 181 as shown in FIG. 7. As a result, in the terminal plate 160F included in the fuel cell 10 of the embodiment, the current collecting terminal 161 protruded from the plate outer circumferential end of the core plate 181 is effectively cooled down by the low-temperature cooling water. This suppresses a temperature rise of the current collecting terminal 161 to high temperature.

In the terminal plate 160F included in the fuel cell 10 of the embodiment, the plate adhesive seal member 184 is provided to form the cooling water supply hole 166IN by sealing the hole circumferential wall surfaces of the respective plate through holes 181h to 183h of the core plate 181h and the cell-side plate 182 and the end plate-side plate 183 placed across the core plate 181h. Sealing by the plate adhesive seal member 184 prevents the plate end faces (more specifically, the hole circumferential wall surfaces of the plate through holes 181h to 183h) of the layered different metal plates, i.e., the aluminum core plate 181 and the titanium cell-side plate 182 and the titanium end plate-side plate 183, from being exposed to cooling water. This configuration of the fuel cell 10 of the embodiment highly effectively suppresses electric corrosion of the terminal plate 160F in which the core plate 181 is placed between the cell-side plate 182 and the end plate-side plate 183.

The fuel cell 10 of the embodiment is configured by stacking a plurality of the unit cells 100 as power generation units and placing the terminal plate 160F on one end and the terminal plate 160E on the other end of the unit cells 100 in the stacking direction. The fuel cell 10 of the embodiment includes the terminal plate 160F that serves to suppress a temperature rise and electric corrosion of the current collecting terminal 161. This improves the durability and the cell life of the fuel cell 10. The fuel cell 10 of the embodiment is readily produced by replacing the terminal plate of the conventional fuel cell with the terminal plate 160I. This reduces the manufacturing cost.

Figure 8:
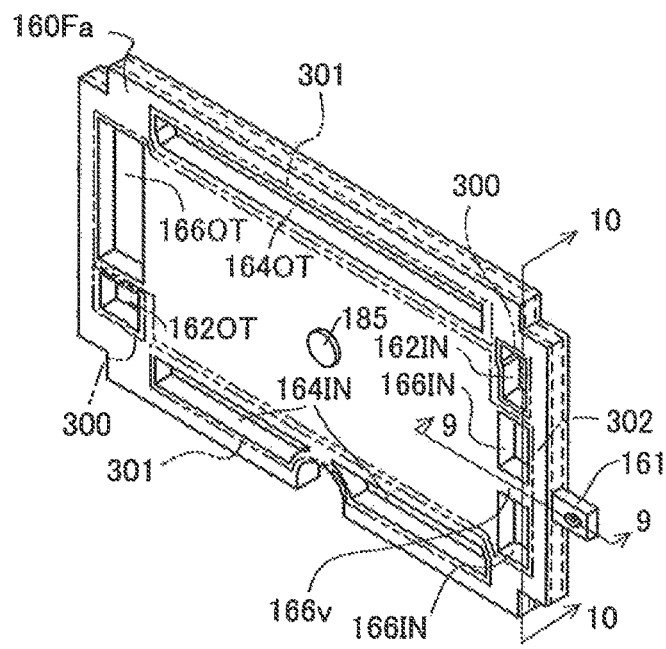
FIG. 8 is a schematic perspective view illustrating a terminal plate according to a second embodiment.
Figure 9:
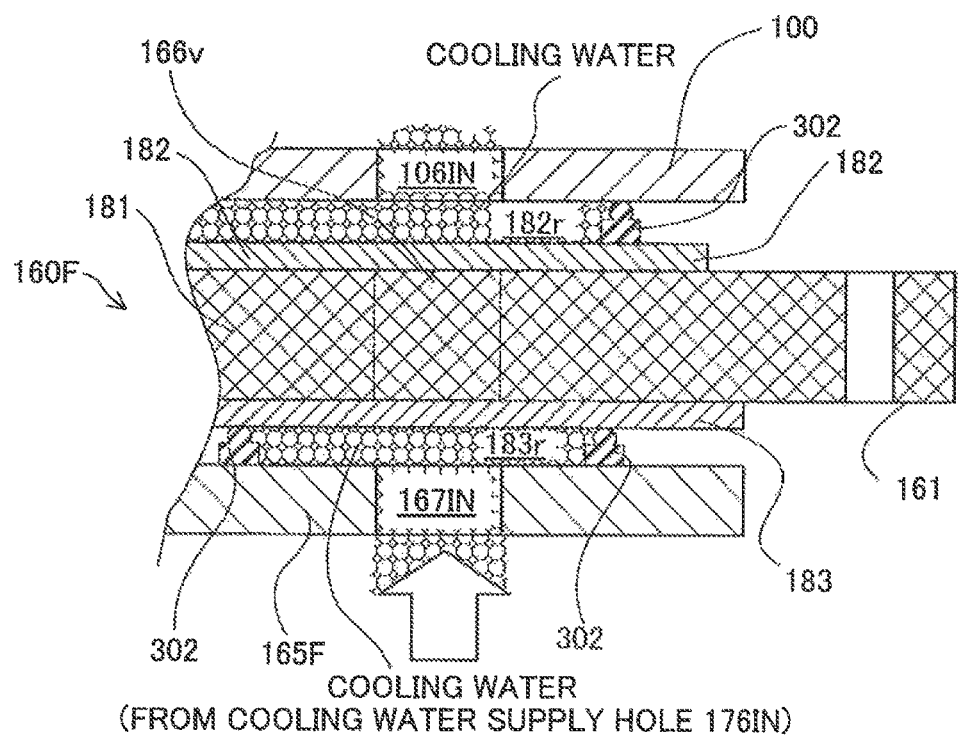
FIG. 9 is a sectional view illustrating the state of cooling water in the periphery of a cooling water supply hole, taken on a line 9-9 in FIG. 8.
Figure 10:
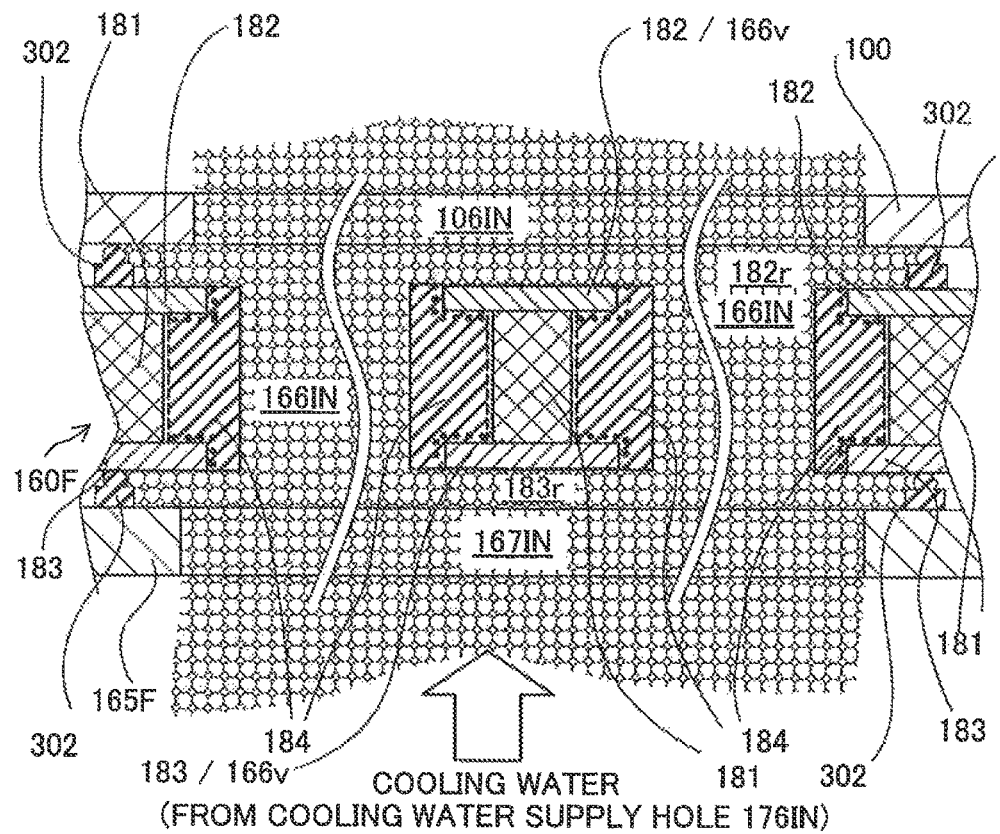
FIG. 10 is a sectional view illustrating the state of cooling water in the periphery of the cooling water supply hole, taken on a line 10-10 in FIG. 8.

The following describes another embodiment. FIG. 8 is a schematic perspective view illustrating a terminal plate 160Fa according to a second embodiment. FIG. 9 is a sectional view taken on a line 9-9 in FIG. 8. FIG. 10 is a sectional view taken on a line 10-10 in FIG. 8.

As illustrated, in the terminal plate 160Fa, a current collecting terminal 161 is protruded from the plate outer circumferential end in a direction from a cooling water supply hole 166IN on the cooling water supply side toward the plate outer circumferential end. In the terminal plate 160Fa, however, the cooling water supply hole 166IN is divided into two sections by bridges 166v. A plate adhesive seal member 184 is provided to additionally seal bridge circumferential wall surfaces of the bridges 166v as shown in FIG. 10. The current collecting terminal 161 is protruded from the plate outer circumferential end in a direction from the bridges 166 toward the plate outer circumferential end. In other words, the plate adhesive seal member 184 is provided to seal the hole circumferential wall surfaces of the respective sections of the cooling water supply hole 166IN parted by the bridges 166v.

In the terminal plate 160Fa of this embodiment, as shown in FIGS. 9 and 10, cooling water flowing that flows through a cooling water supply hole 167IN to spread over a flow area 182r and a flow area 183r is the cooling water on the supply side and has low temperature. The bridge 166v of the cell-side plate 182 and the bridge 166v of the end plate-side plate 183 are directly exposed to the cooling water to be cooled down. This results in cooling down the core plate 181 in the area placed between the two bridges 166v and the current collecting terminal 161 via the bridges 166v. The terminal plate 160Fa of this embodiment thus highly effectively suppresses a temperature rise of the current collecting terminal 161 to high temperature.

Figure 11:
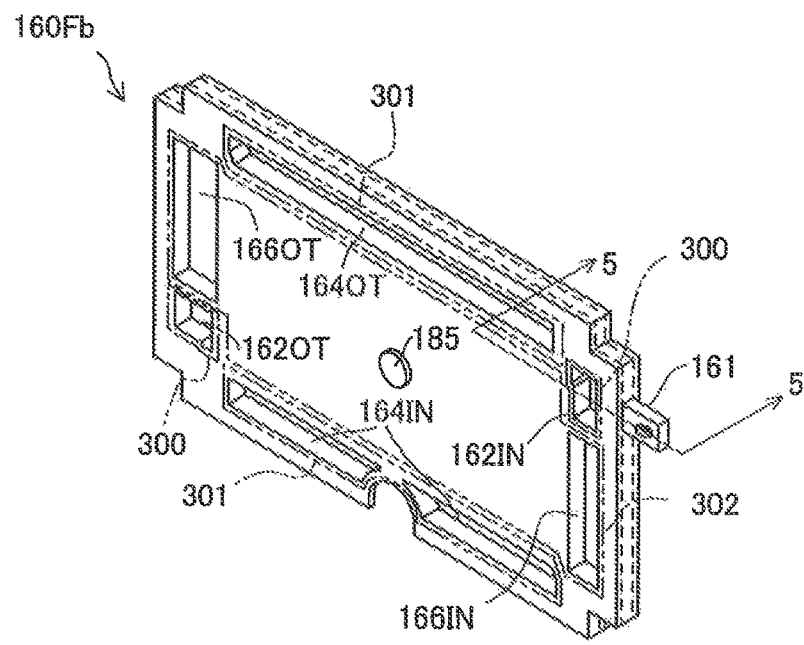
FIG. 11 is a schematic perspective view illustrating a terminal plate according to a third embodiment.
Figure 12:
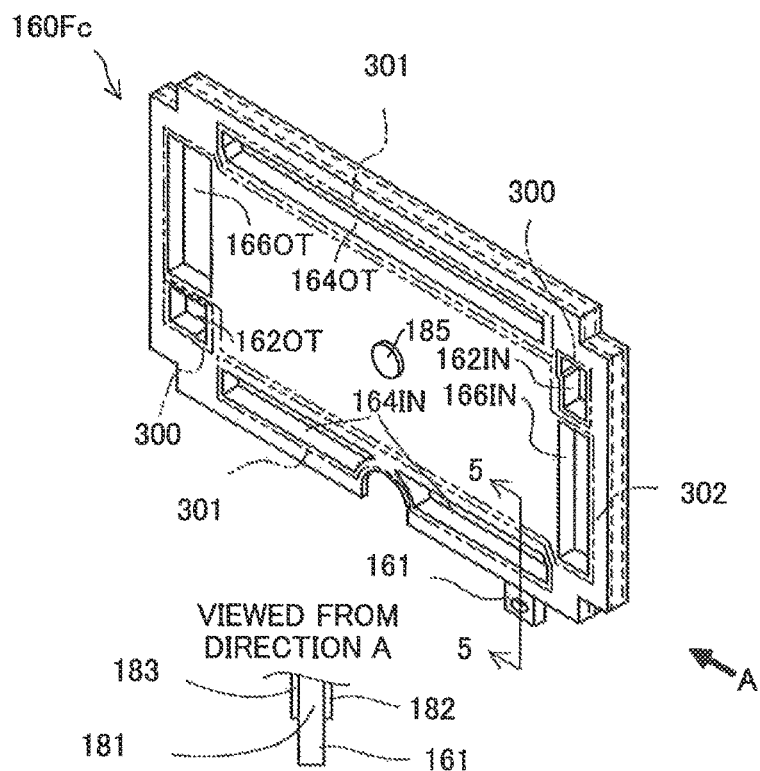
FIG. 12 is a schematic perspective view illustrating a terminal plate according to a fourth embodiment.

FIG. 11 is a schematic perspective view illustrating a terminal plate 160Fb according to a third embodiment. FIG. 12 is a schematic perspective view illustrating a terminal plate 160Fc according to a fourth embodiment. In the configurations of these embodiments, a current collecting terminal 161 is protruded from the plate outer circumferential end in a direction from a fuel gas supply hole 162IN on the fuel gas supply side toward the plate outer circumferential end or in a direction from an oxidizing gas supply hole 164IN on the oxidizing gas supply side toward the plate outer circumferential end. The terminal plate 160Fb and the terminal plate 160Fc respectively have sections taken on a line 5-5 in FIG. 11 and taken on a line in FIG. 12 like FIG. 5 described above. In the configurations of these embodiments, the fuel gas or the oxidizing gas is the gas on the supply side and generally has low temperature. The low-temperature gas cools down the current collecting terminal 161 with high efficiency. This accordingly suppresses a temperature rise of the current collecting terminal 161 to high temperature.

Figure 13:
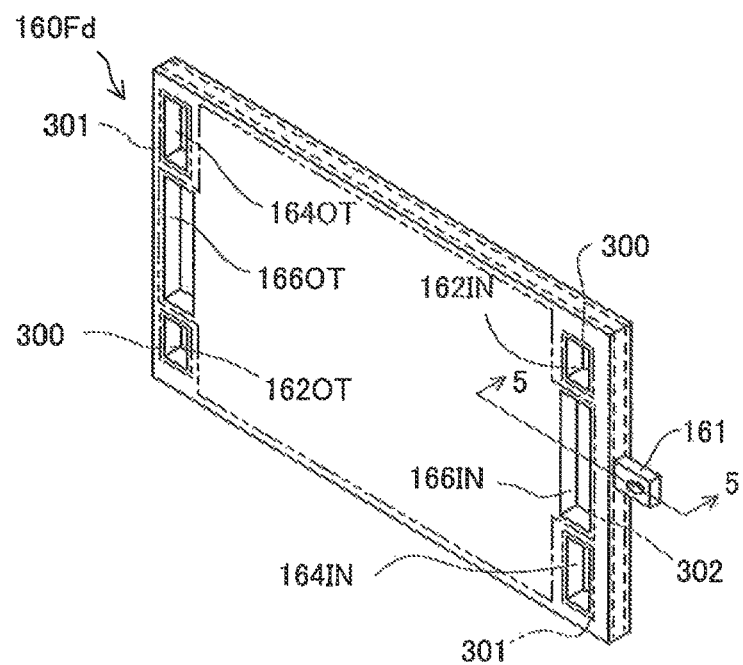
FIG. 13 is a schematic perspective view illustrating a terminal plate according to a fifth embodiment.
Figure 14:
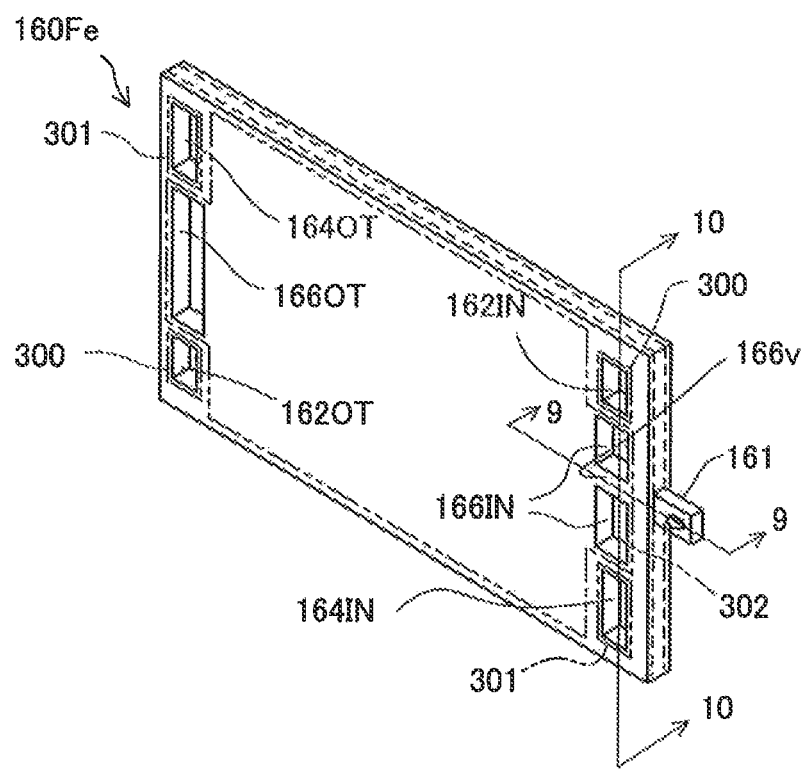
FIG. 14 is a schematic perspective view illustrating a terminal plate according to a sixth embodiment.

FIG. 13 is a schematic perspective view illustrating a terminal plate 160Fd according to a fifth embodiment. FIG. 14 is a schematic perspective view illustrating a terminal plate 160Fe according to a sixth embodiment. The terminal plate 160Fd has a section taken on a line 5-5 in FIG. 13 like FIG. 5 described above. The terminal plate 160Fe has sections taken on a line 9-9 and a line 10-10 in FIG. 14 like FIGS. 9 and 10 described above. In the configurations of these embodiments, a fuel gas supply hole 162IN, a cooling water supply hole 166IN and an oxidizing gas supply hole 164IN are arrayed in this sequence from the upper end along one side in a longitudinal direction (x direction in FIG. 1) in the rectangular outer shape of the terminal plate 160Fd or 160Fe. An oxidizing gas discharge hole 164OT, a cooling water discharge hole 166OT and a fuel gas discharge hole 162OT are arrayed in this sequence from the upper end along the other side in the longitudinal direction in the rectangular outer shape of the terminal plate 160Fd or 160Fe. Despite the difference in locations of the supply and discharge holes, like the terminal plate 160F of the first embodiment, in the terminal plate 160Fd of the fifth embodiment, a current collecting terminal 161 is protruded from the plate outer circumferential end in a direction from the cooling water supply hole 166IN on the cooling water supply side toward the plate outer circumferential end. Like the terminal plate 160Fa of the second embodiment, in the terminal plate 160Fe of the sixth embodiment, the cooling water supply hole 166IN is divided into two sections by bridges 166v, and a current collecting terminal 161 is protruded from the plate outer circumferential end in a direction from the bridges 166v toward the plate outer circumferential end. In the configurations of these embodiments, the current collecting terminal 161 is cooled down with high efficiency by the low-temperature cooling water on the supply side. This suppresses a temperature rise of the current collecting terminal 161 to high temperature.

The invention is not limited to any of the embodiments described above but may be implemented by a diversity of other aspects and configurations without departing from the scope of the invention. For example, the technical features of any of the embodiments corresponding to the technical features of each of the aspects described in SUMMARY may be replaced or combined appropriately, in order to solve part or all of the problems described above or in order to achieve part or all of the advantageous effects described above. Any of the technical features may be omitted appropriately unless the technical feature is described as essential herein.

In the terminal plate 160F and the terminal plate 160E of the above embodiment, the positional misalignment between the core plate 181 and the end plate-side plate 183 is mechanically suppressed by one inter-plate pin 185. According to a modification, the core plate 181 and the end plate-side plate 183 may be joined with each other by two or more inter-plate pins 185. The two or more inter-plate pins 185 suppress a rotational shift between the core plate 181 and the end plate-side plate 183, in addition to the positional misalignment between the core plate 181 and the end plate-side plate 183.

When there is a need to form a cooling water flow path on the unit cell 100-side based on the relationship between the terminal plate 160F and the stack of unit cells 100, a metal plate for forming the cooling water flow path may be employed for the cell-side plate 182 of the terminal plate 160F. In the above embodiment, the cooling water seal member 302 is provided to surround the cooling water flow path (grooves) formed in the same plane as the cooling water seal member 302 to make the flow of cooling water in the plate surface, along with the cooling water supply hole 166IN. When the cooling water flow path is not formed in the same plane, the cooling water seal member 302 may be provided to surround the cooling water supply hole 166In across a predetermined distance. The predetermined distance denotes a distance across which the cell-side plate 182 or the end plate-side plate 183 corresponding to the second metal plate is exposed to cooling water. With regard to the fuel gas supply hole 162IN or the oxidizing gas supply hole 164IN, the seal member 300 or 301 may be provided at a location surrounding the corresponding supply hole 162IN or 164IN, in the case where the plate adhesive seal member 184 is not placed to form the supply hole 162IN or 164IN. In this modified configuration, the cell-side plate 182 or the end plate-side plate 183 corresponding to the second metal plate is directly exposed to the gas inside of the supply hole.

In the terminal plate 160F and the terminal plate 160E of the above embodiment, the core plate 181 is gold-plated and is not bonded to the plate adhesive seal member 184 at the plate outer circumferential end face and the hole circumferential wall surface 181hs. Gold-plating is, however, not essential but may be replaced by another metal-plating to provide the low activity such as chromium-plating or by oxide film formation process. In the case where the plate adhesive seal member 184 is configured to have sufficient thickness and strength or in the case where the respective plates 181, 182 and 183 are configured to have little difference in expansion coefficient, the core plate 181 may not be gold-plated and may be bonded to the plate adhesive seal member 184. Any suitable metals other than aluminum and titanium may be employed for the core plate 181 and for the cell-side plate 182 and the end plate-side plate 183. For example, the core plate may be made of copper, nickel or an alloy thereof, instead of aluminum. The cell-side plate 182 and the end plate-side plate 183 may be made of stainless steel or high-tension steel, instead of titanium.

What is claimed is:

1. A terminal plate for fuel cell, comprising
a plate stacked body including:
   a first metal plate that is electrically conductive and has a current collecting terminal for power collection, and
   a second metal plate and a third metal plate that have higher corrosion resistance than the first metal plate and are placed on each side of the first metal plate;
a gas flow hole that is formed to pass through the plate stacked body on an inner side of a stacked body outer periphery;
a cooling water flow hole that is formed to pass through the plate stacked body on the inner side of the stacked body outer periphery such as not to interfere with the gas flow hole; and
at least either one of:
   a first gasket that is mounted to the second metal plate and is provided to surround a gas flow area which communicates with the gas flow hole on the second metal plate-side; and
   a second gasket that is mounted to the second metal plate and is provided to surround a cooling water flow area which communicates with the cooling water flow hole, on the second metal plate-side,
wherein the current collecting terminal is protruded from a plate outer circumferential end of the first metal plate in a direction from one flow hole of the gas flow hole used for supply of a gas and the cooling water flow hole used for supply of cooling water toward the plate outer circumferential end of the first metal plate,
wherein the gas flow hole and the cooling water flow hole are arranged within an end portion of the first metal plate, the end portion of the first metal plate extending along the plate outer circumferential end such that the current collecting terminal is cooled by at least either one of gas in the gas flow hole and cooling water in the cooling water flow hole, and
wherein the one flow hole is provided with the gasket.

2. The terminal plate for fuel cell according to claim 1, wherein at least the cooling water flow hole has a hole circumferential wall surface sealed by a seal member.

3. The terminal plate for fuel cell according to claim 1, wherein the one flow hole from which the current collecting terminal of the first metal plate is protruded is divided into a plurality of holes, and a seal member is provided to seal a bridge wall of a bridge located between the plurality of holes, and
the current collecting terminal is protruded from the plate outer circumferential end of the first metal plate in a direction from the bridge toward the plate outer circumferential end of the first metal plate.

4. The terminal plate for fuel cell according to claim 2, wherein the one flow hole from which the current collecting terminal of the first metal plate is protruded is divided into a plurality of holes, and a seal member is provided to seal a bridge wall of a bridge located between the plurality of holes, and
the current collecting terminal is protruded from the plate outer circumferential end of the first metal plate in a direction from the bridge toward the plate outer circumferential end of the first metal plate.

5. A fuel cell, comprising
a cell stack configured by stacking a plurality of unit cells as power generation units; and
the terminal plates for fuel cell according to claim 1, which are placed on one end and on the other end in a stacking direction of the cell stack.

6. A fuel cell, comprising
a cell stack configured by stacking a plurality of unit cells as power generation units; and
the terminal plates for fuel cell according to claim 2, which are placed on one end and on the other end in a stacking direction of the cell stack.

7. A fuel cell, comprising
a cell stack configured by stacking a plurality of unit cells as power generation units; and
the terminal plates for fuel cell according to claim 3, which are placed on one end and on the other end in a stacking direction of the cell stack.

8. A fuel cell, comprising
a cell stack configured by stacking a plurality of unit cells as power generation units; and
the terminal plates for fuel cell according to claim 4, which are placed on one end and on the other end in a stacking direction of the cell stack.

9. The terminal plate for fuel cell according to claim 1, wherein a line intersecting the gas flow hole and the cooling water flow hole is perpendicular to the direction in which the current collecting terminal is protruded from the plate outer circumferential end.

* * * * *